Oct. 6, 1936.  W. VENEMA  2,056,495
LOADER FOR VEHICLES
Filed March 24, 1934  2 Sheets-Sheet 2
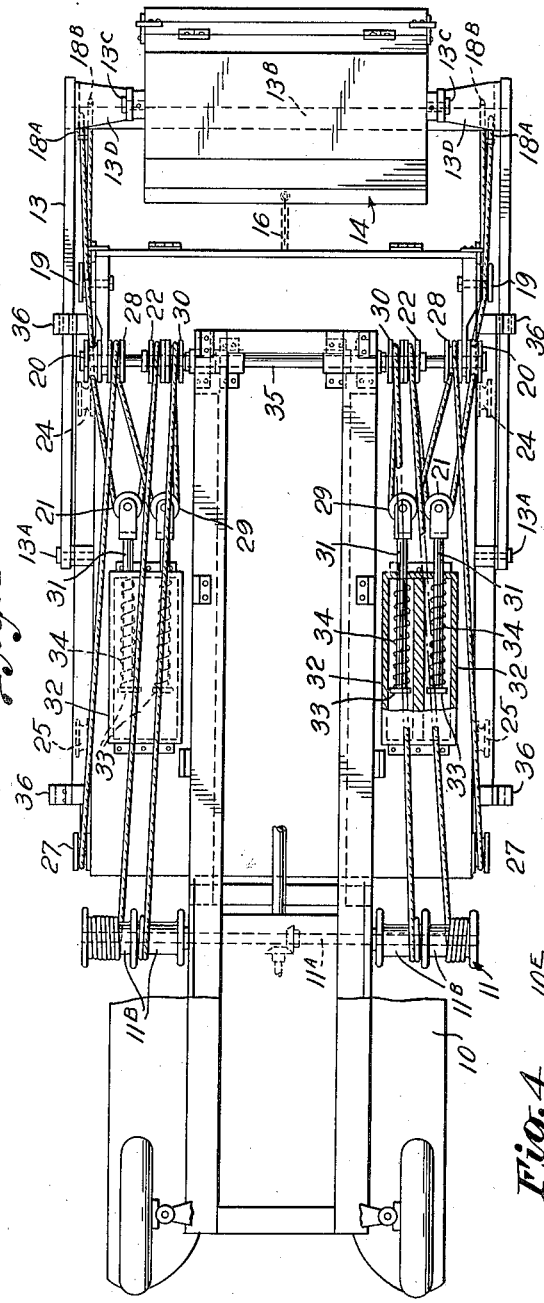
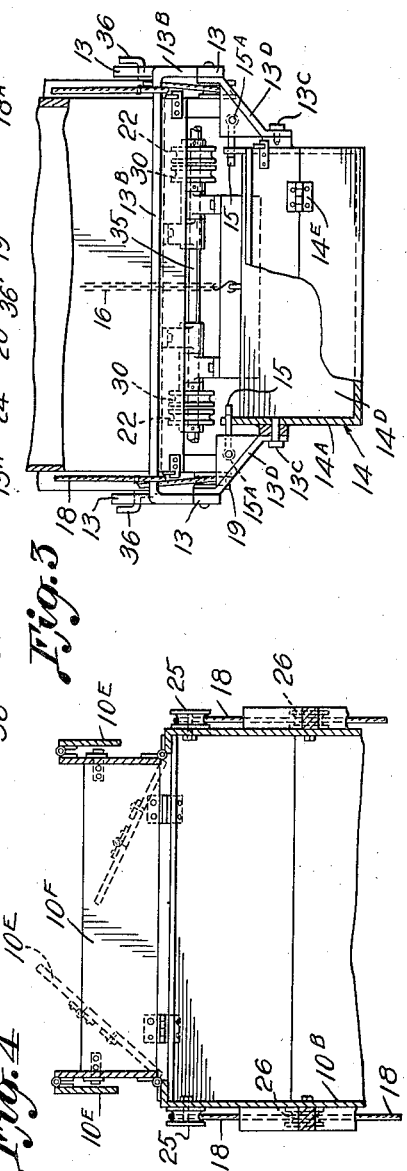
Inventor:
WILLIAM VENEMA
By Frank J Schraeder Jr
Attorney.

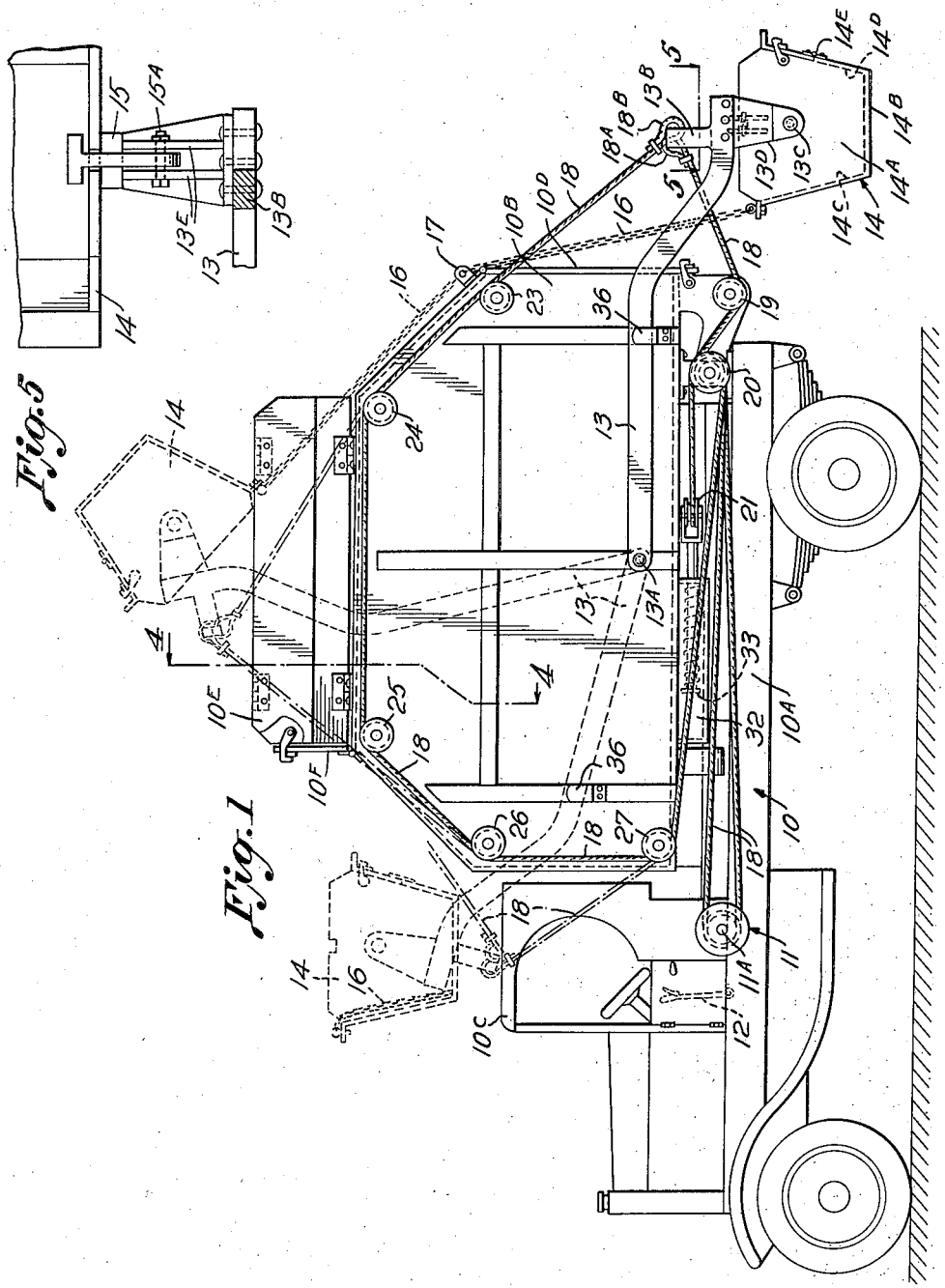

Patented Oct. 6, 1936

2,056,495

UNITED STATES PATENT OFFICE 2,056,495

LOADER FOR VEHICLES

William Venema, Cicero, Ill.

Application March 24, 1934, Serial No. 717,140

3 Claims. (Cl. 214—67)

This invention relates generally to loaders and has particular reference to loaders for dump trucks and other vehicles with which it may be combined for loading various materials thereon.

One of the objects of my invention is to provide a pair of arms pivotally mounted on the vehicle and operated by a power-driven mechanism whereby a load may be lifted from the ground on which the vehicle stands to a point above the vehicle for deposit therein.

Another object of my invention resides in the provision of a bucket or container mounted on the free ends of said arms for loading granular material such as stone, ashes, sand and other material from or near the ground onto a vehicle or for discharge into a vehicle body of a dump truck.

Still another object of my invention is found in the provision of novel means for discharging the load from the bucket into the vehicle body.

A further object of the invention is to provide a novel power-driven mechanism for actuating the bucket supporting arms consisting of a reversible winch and flexible connections between said winch and said arms.

With the above and other objects in view, my invention consists in the novel combination and construction of the parts and members shown in preferred embodiment in the attached drawings, described in the following specifications and particularly pointed out in the appended claims.

Referring to the drawings in which like reference numerals indicate like or corresponding parts:—

Fig. 1 is a side elevation of dump truck embodying a preferred form of my invention.

Fig. 2 is a bottom view of the dump truck showing the winch and flexible bucket arm operating cables.

Fig. 3 is an end view of the bucket looking toward the end of the truck with parts shown in section.

Fig. 4 is a cross section taken on line 4—4 of Fig. 1 showing the cover for the truck body inlet opening.

Fig. 5 is an enlarged cross section taken on line 5—5 of Fig. 1 showing a stabilizing device for retaining the bucket in vertical position during loading.

Referring now to the illustrations, the dump truck generally indicated by numeral 10 includes a frame 10$^A$, tiltable body or container 10$^B$, is a winch 11 which may be driven in any suitable manner from the truck engine or mechanism which is employed to tilt the truck body 10$^B$ through a suitable clutch mechanism controlled by an operating lever 12.

The winch 11 is provided with a shaft 11$^A$ on the ends of which are mounted the spools or winch heads 11$^B$.

A pair of bent swingable arms 13 is pivotally mounted at 13$^A$ and preferably to the sides of the body 10$^B$. The free ends of the arms 13 are cross-connected with a yoke or member 13$^B$ of U-shape form which extends in spaced distance across the top of the bucket 14 to permit easy access to, and loading of, the bucket.

The free ends of the arms 13 are also provided with inwardly disposed brackets 13 which support spindles 13$^C$ for pivotally supporting the loading bucket 14.

The preferable form of loading bucket here shown consists of ends 14$^A$, a bottom plate 14$^B$, and side plates 14$^C$ and 14$^D$. To facilitate the loading of the bucket the upper half of the side plate 14$^D$ is hingedly mounted on hinges 14$^E$ as clearly shown in Figs. 1, 2, and 3.

The bucket 14 is provided with spindles 13$^C$ fixed to its ends 14$^A$ which spindles 13$^C$ are loosely mounted, as pivots, in the ends of the arms brackets 13$^D$ which are fixed to the free ends of the arms 13.

The brackets 13$^D$ are each provided with a pair of spaced supports 13$^E$ for the pins 15$^A$ which form pivotal supports for the T-shaped bucket retaining members 15. The bucket ends 14$^A$ are recessed in the top edges of the ends 14$^A$ to receive the members 15 to thus retain the bucket 14 in vertical position during its loading as shown in Figs. 1, 3, and 5. The retaining members 15 are arranged to be moved upwardly out of the recesses after the loading of the bucket to permit its tilting when in proper discharge position.

The truck body or container 10$^B$ is provided with a discharge gate 10$^D$ and a pair of inlet gates 10$^E$ which open upwardly and cooperate with a hinged end plate 10$^F$ to form upstanding guard plates for the inlet opening of the container 10$^B$ to prevent any spill from the bucket 14 when it is raised to discharge position over the body as shown in dotted lines of Fig. 1. Since the bucket is tiltable, an adjustable chain 16 attached thereto at one end and hooked at its other end into the ear 17 causes the bucket to tilt into proper discharge position.

The raised position of the bucket when the truck is in transit, is shown in Fig. 1, by dotted lines in the extreme left hand position.

In Fig. 2, I show the winch 11 and the flexible cables or connections to the bucket-operating arms 13.

The arms 13 are connected together with a yoke or cross-bar 13B to which are connected the ends 18A and 18B of the pair of cables 18 operatively mounted on each side of the truck body as shown in Figs. 1, 2, 3, and 4. These cables may be traced from the connection 18A as passing under the corner sheave 19 thence over sheave 20, thence around tightener sheave 21, then over sheave 22 to the winch head 11B about which the cable is wrapped two or three turns and is then secured thereto.

Tracing the cable 18 from connection 18B the same passes over the body sheaves 23, 24, 25, 26, and 27 and around the sheave 28 and around tightener sheave 29 and thence around sheave 30 and then to the inside winch head 11B for connection thereto.

To keep the cables taut, the sheaves 21 and 29 are each secured to one end of a rod 31 which rods are slidable in casings 32 and provided with heads 33 between which and the casing ends are coil springs 34 which tend to pull sheaves 21 and 29 to thereby keep the operating cables 18 taut.

It will also be observed from Fig. 2, that the sheaves 20, 22, 28, and 30 are all mounted on a common shaft 35 which shaft forms the pivotal point for the tiltable truck body 10B.

The arrangement is such that during all tilting positions of the truck body, the flexible operating cables 18 will be maintained taut by means of the springs 34.

The winch shaft 11A is provided with any suitable reversibly driven mechanism which is controlled in any suitable manner from the operator's cab 10C as for instance by a lever 12.

From the above description and attached drawings, it will readily be understood that the reversibly-driven winch heads 11B control, through the flexible cables 18, the swinging movements of the pivotally mounted arms 13 in such manner that the bucket 14 may be raised from the loading position as shown by the full lines in Fig. 1, to that of the dumping position as shown by the dotted lines and then discharged of its contents into the truck body. The operation of the lever 12 controls all positions of the bucket 14 from loading position over the truck body or to the position of the bucket 14 over the cab 10C while the truck is in transit.

It is apparent that when the bucket 14 is movable into its position over the cab 10C, the dumping chain 16 must be disconnected from the ear 17 and dropped into the bucket.

The body 10B may also be provided with brackets 36 fixed to its sides which support the arms 13 in their extreme loading and transit positions.

While I have herein disclosed my invention in a preferred embodiment, I do not wish to be understood as limiting myself thereto as the construction details and arrangement shown in the drawings may be modified without departing from the spirit of the invention embodied in the appended claims.

I claim:
1. Loading apparatus for vehicles having a pivotally supported container body, said apparatus including a pair of arms pivotally supported at one end on the sides of said container body, an inwardly disposed bracket on the free end of each of said arms, a bucket pivot pin carried by each of said brackets, a bucket pivotally supported on said bucket pivot pins, a latch pivotally mounted on one of said brackets and adapted to engage the bucket to retain the bucket in proper loading position, said latch being movable into position to release the bucket before its movement to discharging position, a single pivot shaft for said container body mounted on the frame of the vehicle, a plurality of cable guide sheaves mounted on said container body pivot shaft, a reversible winch mechanism having a plurality of winch drums, cable guide sheaves on the sides of said container body, flexible cables trained over said guide sheaves on said container body and on said container body pivot shaft and forming operating means connecting said winch drums with said bucket-supporting arms, and resilient means for maintaining said flexible cables taut during all positions of said bucket and said container body.

2. Loading apparatus for vehicles having a tiltable container body, said apparatus including a pair of bars constituting arms pivotally mounted at one end to the sides of said body, each of said arms having an angularly disposed extension at the opposite end thereof, a loading bucket pivotally mounted on said extensions, power-driven operating means including flexible cables and winch mechanism for swinging said arms and bucket from a lower position to a higher position over the top of said body, guiding sheaves for said cables mounted on the sides of and underneath said body, resilient means for maintaining said cables taut during all positions of said bucket and said tiltable body, and means for discharging said bucket into said body, said power-driven operating means being continuously operatively connected with power transmitting means during all positions of the tiltable body.

3. Loading apparatus for vehicles having a tiltable container body, said apparatus including a pair of bars constituting arms pivotally mounted at one end to the sides of said body, a loading bucket pivotally mounted on said arms, power-driven operating means including flexible cables and winch mechanism for swinging said arms and bucket from a lower position to a higher position over the top of said body, guiding sheaves for said cables mounted on the sides of and underneath said body, resilient means for maintaining said cables taut during all positions of said bucket and said tiltable body, and means for discharging said bucket into said body, said power-driven operating means being continuously operatively connected with power transmitting means during all positions of the tiltable body.

WILLIAM VENEMA.